Feb. 8, 1927.

J. W. PEPPLE 1,616,635

VEHICLE WHEEL

Filed Jan. 26, 1924

Inventor
John W. Pepple
By F. E. Shannon
Attorney

Patented Feb. 8, 1927.

1,616,635

UNITED STATES PATENT OFFICE.

JOHN W. PEPPLE, OF AKRON, OHIO.

VEHICLE WHEEL.

Application filed January 26, 1924. Serial No. 688,700.

This invention relates to new and useful improvements in wheels and has particular relation to disk wheels.

Objects of the invention are to provide a disk wheel of simple construction which may be manufactured at a relatively low cost and which in use will be strong and durable and exceedingly attractive in appearance.

Other objects are to provide a disk wheel having a demountable rim which is detachably secured thereto so that no bolts or lugs are disclosed on the outer surface thereof and which is provided with improved means for attaching the same to a hub without the use of the ordinary bolts and to thereby provide an exceedingly attractive durable wheel.

A further object is to provide a disk wheel having a brake drum secured to the hub whereby the disk portion of the wheel may be detachably secured in interlocking engagement therewith, without the use of bolts or screws.

The above objects are accomplished and additional ends are attained by the novel construction, combination and arrangement of parts herein described with reference to the accompanying drawing in which I have shown a preferred embodiment of the invention, it being understood that the invention is capable of various adaptations and that changes and modifications may be made or substitutions resorted to which come within the scope of the appended claims.

In the drawings in which similar characters of reference have been employed to designate like parts as the same may appear in any of the several views and in which:—

Figure 1:
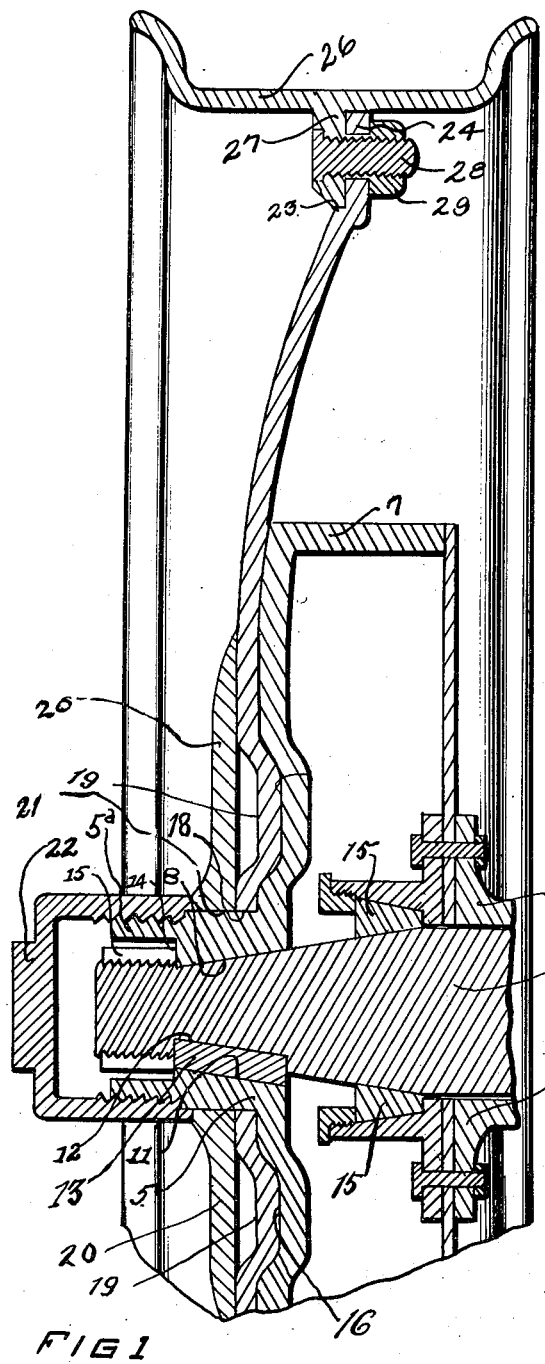
Figure 1 is a central, vertical, sectional view of a wheel constructed in accordance with this invention, the lower part of the wheel being broken away.
Figure 2:
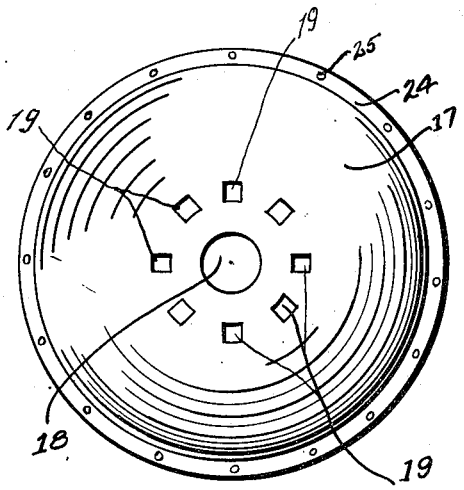
Figure 2 is a plan view of a disk portion of said wheel.
Figure 3:
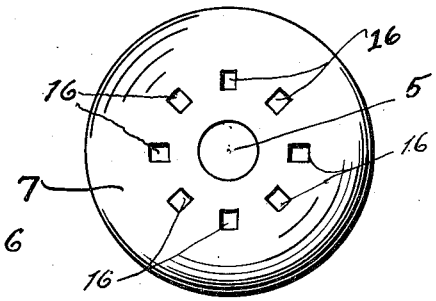
Figure 3 is a plan view of the outer axial face of the hub and brake drum.
Figure 4:
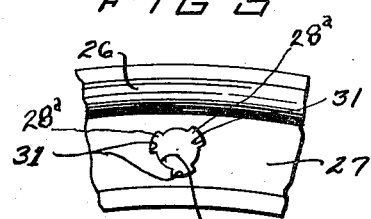
Figure 4 is a fragmentary view showing in side elevation a portion of the detachable rim employed in carrying out the invention.

Proceeding now to a detailed description of the invention with reference to the particular adaptation thereof illustrated in the drawings, the numeral 5 is used to denote a hub which is mounted in a suitable housing 6. The hub is provided with a brake drum 7 which as shown in the drawings is integral therewith but may be separately formed and secured thereto in any suitable manner. The hub 5 is provided with a tapered bore 8 in which is mounted the outer end of the driving axle 9. The wall of the bore 8 is provided adjacent the forward end thereof with a key-way 11 and the axle 9 is likewise provided with a keyway 12 in which is mounted the key 13 whereby the axle 9 is fixed relative to the hub 4. The hub 4 is provided at the outer end thereof with an outwardly projecting axial cylindrical projection $5^a$. The bore in the projection $5^a$ is relatively larger than the bore in the hub, thus providing the offset shoulder 14. The axle 9 is threaded at the outer end thereof and a nut 15 is operatively positioned thereon so as to bear against the shoulder 14 and retain the axle 9 in position in said bore 8.

The numeral 15 denotes roller bearings which are positioned between the axle 9 and the housing 6. The outer axial face of the brake drum 7 is provided at points adjacent the hub 5 with a concentrically extending series of regularly spaced depressions 16, which are formed therein for the purpose presently to appear. The numeral 17 denotes the disk portion or main body of the wheel. The disk 17 is provided in the center thereof with a round opening 18 which is adapted to fit over the extension $5^a$ on the hub 5. The disk 17 is provided in close spaced relation to the opening 18 with a circumferentially extending series of regularly spaced depressions 19 which are stamped therein to form inwardly projecting lugs adapted to fit in the depressions 16 in the drum 7. The outer axial face of the disk 17 is slightly convex so that when it is properly positioned on the hub 5, the peripheral edge thereof will lie in a vertical plane extending centrally through the bearing 15.

The numeral 20 denotes a circular plate having a central opening 21 which is adapted to receive the extension $5^a$ on the hub 5. The extension $5^a$ is exteriorly threaded adjacent the outer end thereof and the plate 20 is positioned on said extension. The numeral 22 denotes an internally threaded hollow cap which is operatively threaded on the extension $5^a$ so as to bear against the plate 20, thus forcing the said plate against the disk 17 and holding the lugs formed by the depression 19 in position in the recesses 16.

The disk 17 is provided adjacent the peripheral edge thereof with a concentrically arranged cylindrical shoulder 23. The marginal edge 24 being disposed in a vertical plane. The disk 17 is provided in the marginal portion 24 with the circumferentially extending series of regularly spaced openings 25. The rim 26 is provided on the inner circumferential face thereof with the inwardly projecting radial flange 27. The inner face of said flange 27 being adapted to seat against the outer axial face of the marginal portion 24 and the inner circumferential edge of said portion being adapted to seat on the shoulder 23. The flange 27 is provided with a plurality of stub bolts 28 which are secured thereto so as to be in parallel relation to the axis of the rim 26. The bolts 28 are adapted to be received in the opening 25 in the marginal portion of the disk 17 and the rim is secured in position on the said disk 27 by means of the nuts 29 which are threaded on the bolts 28.

In the drawings, the flange 27 is provided with threaded bores 30 and the bore 30 is enlarged adjacent the outer end thereof by the radial slots 31. The bolt 28 is threaded in the bore 30 and the outer axial end of the bolt swaged or riveted down, thus forcing the portions 28ª into the groove 31 so that the outer axial end of the bolt 28 is forced into said slots and presents a smooth surface which is level with the outer axial face of the flange 27.

In use, the disk 17 may be quickly removed from the hub 5 by unscrewing the cap 22 and it can likewise be quickly and conveniently replaced thereon. The rim 26 can be removed from the disk 17 by unscrewing the nuts 29.

It will therefore be seen that I have provided a wheel of strong, durable construction, which presents a smooth axial face and that no bolts or screws are exposed on the outer surface of the wheel.

While I have shown and described a rear wheel, it will be understood that the invention is adapted to be applied to a front wheel either with or without the brake band 7.

Having thus illustrated my invention and described the same in detail, what I claim as new and desire to secure by Letters Patent is:—

1. In combination, an axle, a hub fitted thereon, a brake drum on said hub, said drum provided on the outer axial face thereof with a circumferentially extending series of indentations, a wheel body comprising a disk coaxially arranged on said hub, said body being indented to provide lugs adapted to seat in the indentations in said drum, a disk fitted on said hub and a cap secured on the hub to clamp the wheel body against said drum.

2. In combination, an axle, an exteriorly threaded hub fitted thereon, a brake drum integral with said hub, said drum provided on the outer axial face thereof with a circumferentially extending series of indentations, a wheel body comprising a disk having a centrally arranged aperture adapted to receive said hub, said body mounted on said hub, indentations in said body arranged to provide lugs adapted to seat in the indentations in said drum, a disk fitted on said hub and covering said indentations in said body, and a cap threaded on said hub so as to bear against said disk and clamp the wheel body against said hub.

3. In a wheel, an axle, a hub keyed thereon, a brake drum on said hub, said drum provided on the outer axial face thereof with a circumferentially extending series of indentations, a wheel body comprising a dished disk coaxially arranged on the said hub with its convex side presented outwardly, said disk being indented to provide lugs adapted to seat in the indentations in said drum, a disk fitted on said hub and a cap secured on the hub to clamp the wheel body against said drum.

4. In a wheel of the class described, in combination, an axle, an exteriorly threaded hub fitted thereon, a brake drum on said hub, said drum provided on the outer axial face thereof with a circumferentially extending series of indentations, a wheel body comprising a concavo-convex disk having a centrally arranged aperture adapted to receive said hub, said body mounted on said hub with its convex side presented outwardly, indentations in said body arranged to provide lugs adapted to seat in the indentations in said drum, a plate having a centrally positioned aperture adapted to receive the outwardly projecting end of said hub, said plate fitted on said hub and covering said indentations in said body and a cap threaded on said hub so as to bear against said plate and clamp the wheel body against said brake drum.

5. In a wheel of the class described, a hub, a brake drum on said hub, a concavo-convex disk mounted on said hub and positioned against said brake drum; inwardly projecting lugs on said disk, said brake drum provided with recesses adapted to receive said lugs, a plate having a centrally positioned aperture, said plate mounted on the outwardly projecting end of said hub, a cap threaded on said hub, said cap bearing against said plate to hold said disk in an operative position against said brake drum.

In testimony whereof I have hereunto set my hand.

JOHN W. PEPPLE.